United States Patent
Hadley et al.

(10) Patent No.: US 6,882,952 B1
(45) Date of Patent: Apr. 19, 2005

(54) SYSTEM AND METHOD FOR MEASURING BUS FREQUENCY

(75) Inventors: Andrew J. Hadley, Colorado Springs, CO (US); Jeffrey K. Whitt, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 960 days.

(21) Appl. No.: 09/795,767

(22) Filed: Feb. 28, 2001

(51) Int. Cl.$^7$ ................................................. G06F 3/05
(52) U.S. Cl. ...................... 702/125; 702/124; 702/179; 702/182
(58) Field of Search ........................ 702/108, 117–119, 702/132, 182, 183; 365/200; 370/352; 381/104; 710/262

(56) References Cited

U.S. PATENT DOCUMENTS 6,260,073 B1 * 7/2001 Walker et al. .............. 709/249
6,421,754 B1 * 7/2002 Kau et al. .................... 710/261
6,618,782 B1 * 9/2003 Gulick et al. ................ 710/305
6,813,674 B1 * 11/2004 Velasco et al. .............. 710/311

* cited by examiner

Primary Examiner—Marc S. Hoff
Assistant Examiner—Felix Suarez
(74) Attorney, Agent, or Firm—Suiter West PC LLO

(57) ABSTRACT

The present invention is directed to a method and system for measuring bus frequency. A system suitable for determining bus frequency may include a bus device and a processor. The bus device is suitable for performing an operation and the processor is communicatively coupled to the bus device utilizing a bus. The processor is capable of starting a timer, initiating the bus device to perform a number of operations, receiving an indication that the bus device completed the number of operations, stopping the timer when the indication is received. A bus clock frequency is computed based upon time taken to complete the number of operations as indicated by the timer and the number of operations performed by the bus device.

20 Claims, 3 Drawing Sheets

SYSTEM AND METHOD FOR MEASURING BUS FREQUENCY

FIELD OF THE INVENTION

The present invention generally relates to the field of bus configurations, and particularly to a method and system for measuring bus clock frequency.

BACKGROUND OF THE INVENTION

The proliferation of information handling systems, such as desktop computers, servers, mobile computers, information appliances, Internet appliances, convergence systems, personal digital assistants, and the like, enable a wide range of functionality to be provided as desired by a user. This functionality has enabled increased productivity of users, businesses, and the like to make advances previously thought impossible. These advances were made possible through the provision of faster information handling systems suitable for use in both fixed and mobile settings. Information handling systems were made faster not only through the use of faster processors, but also through the use of greater bus bandwidth capable of handling these faster speeds, thereby allowing the faster speeds of the processor and components to be fully utilized. However, excluding an external mechanism, there is no accurate method available to determine bus frequency. Thus, designers of information handling systems are unable to accurately determine the frequency of a bus in the information handling system.

Therefore, it would be desirable to provide an accurate method to determine bus frequency.

SUMMARY OF THE INVENTION

Accordingly, the present invention is directed to a method and system for measuring bus frequency. In a first aspect of the present invention, a system suitable for determining bus frequency includes a bus device and a processor. The bus device is suitable for performing an operation and the processor is communicatively coupled to the bus device utilizing a bus. The processor is capable of starting a timer, initiating the bus device to perform a number of operations, receiving an indication that the bus device completed the number of operations, stopping the timer when the indication is received. A bus clock frequency is computed based upon time taken to complete the number of operations as indicated by the timer and the number of operations performed by the bus device.

In a second aspect of the present invention, a method of determining bus frequency includes starting a timer by a processor and initiating a bus device communicatively coupled to the processor over a bus. The bus device is initiated to perform a number of operations. An indication is received by the processor, the indication suitable for indicating that the number of operations was performed by the bus device. The timer is stopped in response to the received indication. A bus clock frequency is computed based upon time taken to complete the number of operations as indicated by the timer and the number of operations performed by the bus device.

In a third aspect of the present invention, a method of determining bus frequency includes initiating a bus device communicatively coupled to a processor over a bus. The bus device is initiated to perform a number of operations. An indication is received by the processor, the indication suitable for indicating that the number of operations was performed by the bus device. A bus clock frequency is computed based upon time taken to complete the number of operations performed by the bus device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 5, exemplary embodiments of the present invention are shown. Currently, there is no accurate method available to determine bus frequency. The addition of dedicated internal timing logic would result in added complexity, cost and size, thereby making such an addition undesirable. Therefore, it would be advantageous to implement a software method and system for accurately determining bus frequency.

Figure 1:
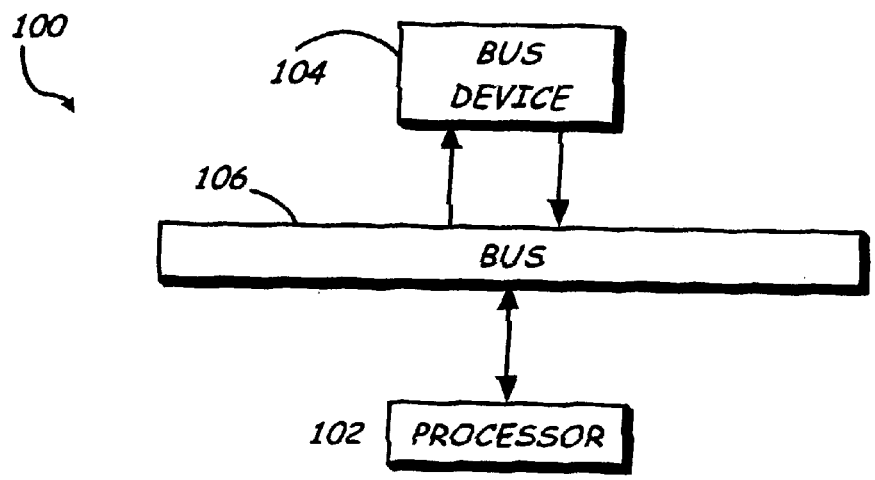
FIG. 1 is a block diagram illustrating an exemplary embodiment of the present invention wherein a bus device and processor are utilized to compute frequency of a bus.

Referring now to FIG. 1, an exemplary embodiment 100 of the present is shown wherein a system is suitable for determining bus frequency in an accurate manner. A processor 102 is coupled to a bus device 104 over a bus 106. The processor 102 may include a computational and control unit suitable for interpreting and executing instructions, such as integrated circuits and single-chip central processing units, and microprocessors. The bus device 104 includes a device suitable for performing an operation and having completion of the operation reported back to the processor 102 over the bus 106. The processor 102 may utilize the operation of the bus device 104 to determine the frequency of the bus, thereby enabling the bus frequency to be determined without dedicated timing logic.

Figure 2:
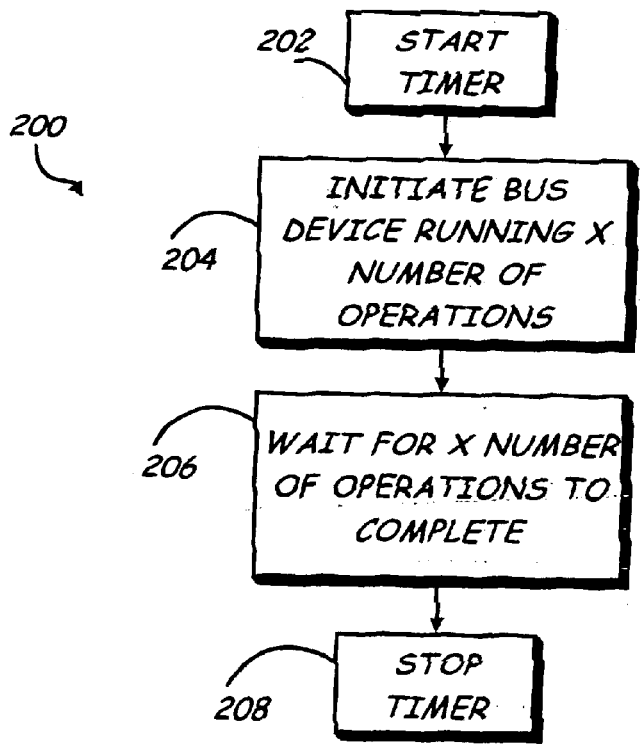
FIG. 2 is a flow diagram of an exemplary method of the present invention wherein a bus device performing a number of operations is utilized by a processor to determine bus frequency.

Referring now to FIG. 2, an exemplary method 200 of the present invention is shown wherein a processor, to determine bus frequency, utilizes a bus device suitable for performing a number of operations. A processor starts a timer

202. A timer may include any sort of timing device accessible by the processor to measure the passage of time, such as a bus clock and the like. A bus device is initiated to run an X number of operations 204.

An X number of operations includes an amount of operations known and/or determined by the processor to be performed by the bus device. Although any number of operations is contemplated by the present invention, as the number of operations to be performed is increased, the accuracy of the computation may be improved by averaging discrepancies and errors in performing the operation over a larger sampling. Therefore, it may be preferable to perform a number of operations of sufficient size to obtain an accurate sampling, such as 512 operations.

The processor waits for the X number of operations to complete 206, at which point the timer is stopped 208. To determine when the X number of operations are completed, the processor may receive an indicator utilized to inform the processor that the operations have completed, may be informed by the operation itself, i.e. the operation returns a result to the processor, and the like as contemplated by a person of ordinary skill in the art without departing from the spirit and scope of the present invention.

Figure 3:
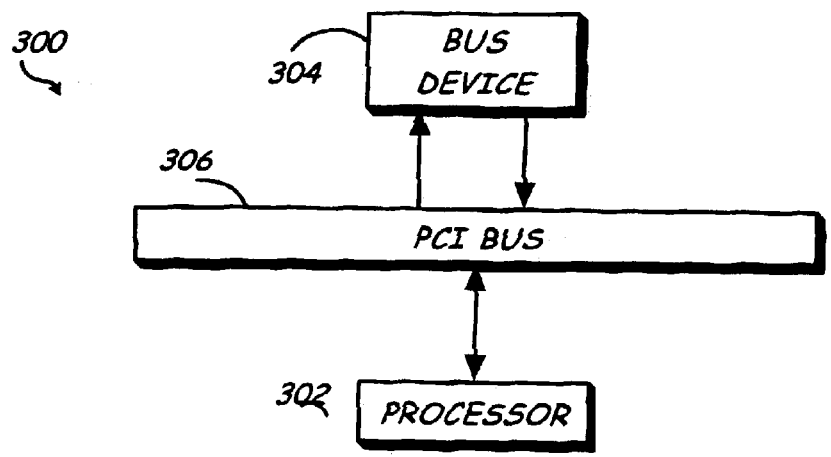
FIG. 3 is a block diagram depicting an exemplary embodiment of the present invention wherein a bus device and processor are utilized to compute speed of a PCI bus.

Referring now to FIG. 3, an exemplary embodiment 300 of the present invention is shown wherein a bus device and processor are utilized to compute bus frequency of a PCI bus. A processor 302, such as a central processing unit, is communicatively coupled to a bus device 304 over a bus 306. The processor 302 utilizes the bus device 304 to perform a number of operations, and computes the bus frequency based upon time taken to complete the number of operations and the number of operations performed by the bus device.

Although computing a bus frequency of a peripheral component interconnect (PCI) bus is described, it should be apparent that a wide variety of buses are contemplated by the present invention without departing from the spirit and scope thereof. For example, the bus may be designed in compliance with any of the following bus architectures: Industry Standard Architecture (ISA), Extended Industry Standard Architecture (EISA), Micro Channel Architecture, Peripheral Component Interconnect (PCI), Peripheral Component Interconnect-X (PCI-X), and the like.

Figure 4:
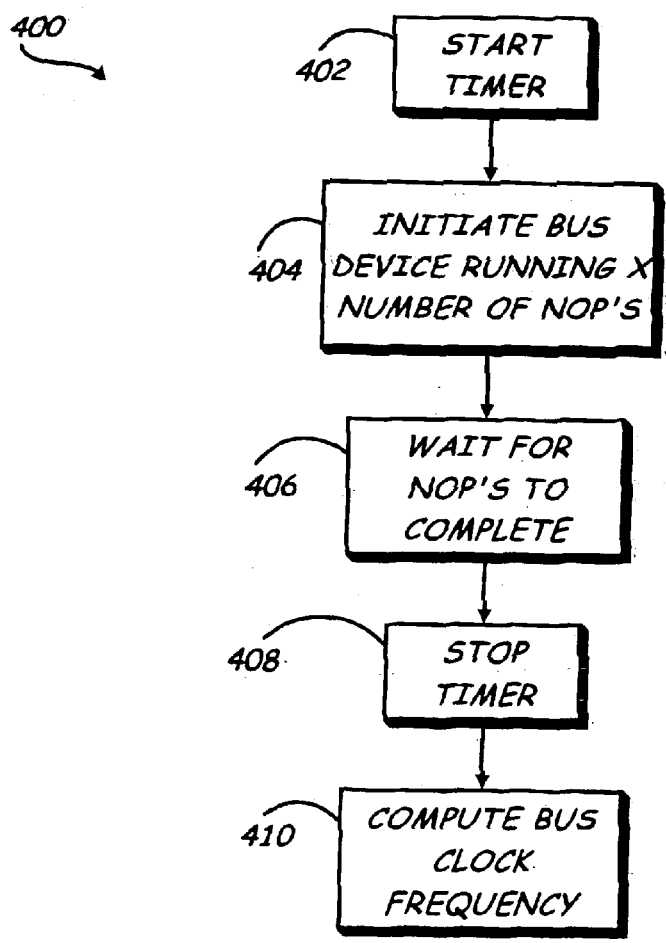
FIG. 4 is a flow diagram of an exemplary method of the present invention wherein a bus device performing a number of NOPs is timed to determine bus frequency of a bus.

Referring now to FIG. 4, an exemplary method 400 of the present invention is shown wherein a bus device performing a number of NOPs is timed to determine frequency of a bus. A processor starts a timer 402, and initiates a bus device to run an X number of no operations (NOPs) 404. The processor may utilize a timer tied in with a bus clock, although other timers are contemplated by the present invention. The processor waits for the X NOPs to complete 406, and stops the timer when completed 408. The bus clock frequency may then be computed 410 by dividing the number of operations by the time needed to perform the operations. Thus, the present invention may be utilized in a software implementation, thereby providing an accurate bus timing method without the need of dedicated internal timing logic.

Figure 5:
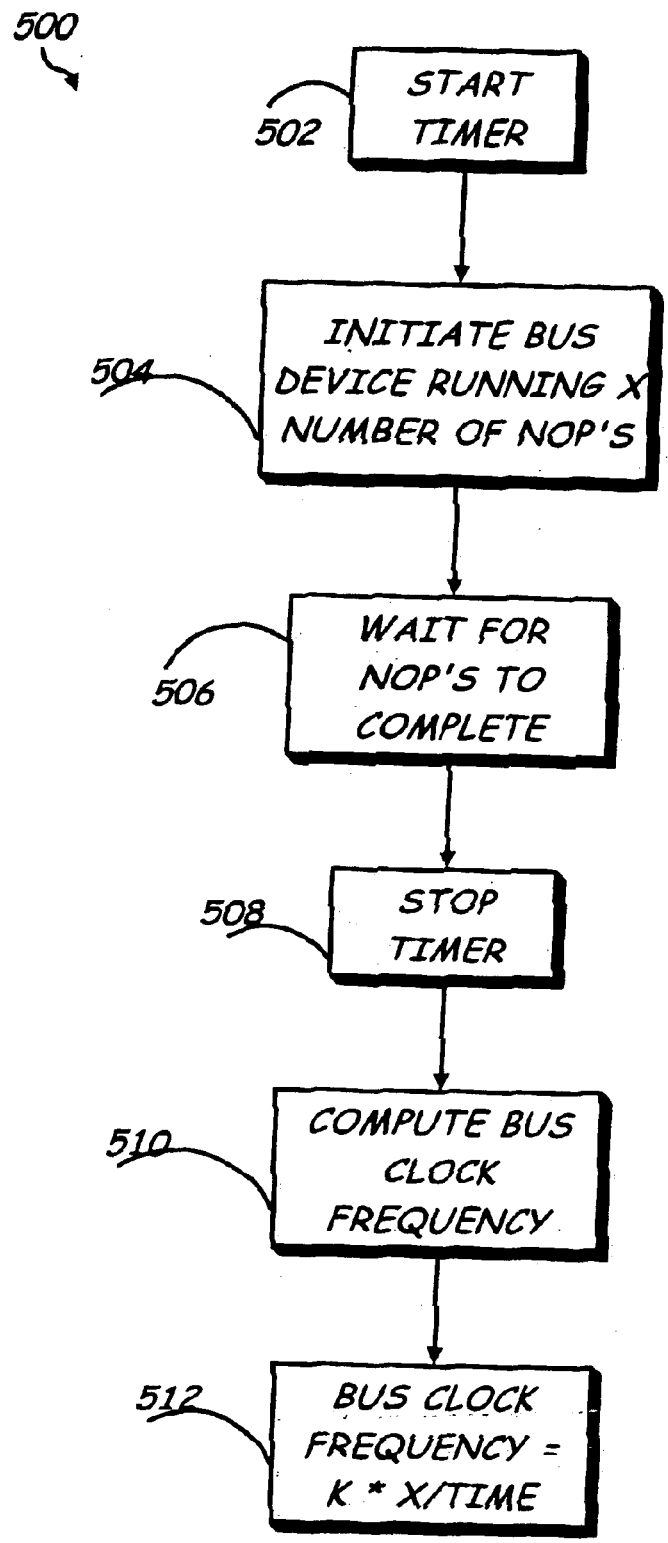
FIG. 5 is a flow diagram illustrating an exemplary method of the present invention wherein an operation taking more than one bus clock cycle to run on a bus device is utilized to compute bus frequency.

Referring now to FIG. 5, an exemplary method 500 of the present invention is shown wherein an operation taking more than one bus clock cycle to run on a bus is utilized to compute bus clock frequency. Operations taking more than one clock period to run, such as K bus clocks, may also be utilized by the present invention to compute bus clock frequency. For example, a timer is started 502 and a bus device is initiated to perform an X number of NOPs 504. The NOPs are performed while the system waits 506, and the timer is stopped when the NOPs are completed 508. The bus clock frequency is then computed 510. In this instance, an NOP takes K clocks to run. Therefore, the bus clock frequency is equal to K multiplied by the number of operations performed, the total of which is then divided by the time taken to perform the number of operations.

Although the invention has been described with a certain degree of particularity, it should be recognized that elements thereof may be altered by persons skilled in the art without departing from the spirit and scope of the invention. One of the embodiments of the invention can be implemented as sets of instructions resident in memory of one or more information handling systems. Until required by the information handling system, the set of instructions may be stored in another readable memory device, for example in a hard disk drive or in a removable memory such as an optical disk for utilization in a CD-ROM drive, a floppy disk for utilization in a floppy disk drive, a floppy/optical disk for utilization in a floppy/optical drive, a personal computer memory card for utilization in a personal computer card slot, and the like. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method for measuring bus frequency of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system suitable for determining bus frequency, comprising:
   a bus device suitable for performing an operation; and
   a processor communicatively coupled to the bus device utilizing a bus, wherein the processor is capable of starting a timer, initiating the bus device to perform a number of operations, receiving an indication that the number of operations were completed by the bus device, stopping the timer when the indication is received and computing a bus clock frequency based upon time taken to complete the number of operations as indicated by the timer and the number of operations performed by the bus device.

2. The system as described in claim 1, wherein the bus clock frequency is computed by the following, the bus clock frequency is equal to X divided by time, wherein X is equal the number of operations performed, and time is equal to time needed to perform the X number of operations.

3. The system as described in claim 1, wherein an operation takes more than one bus clock to perform, the bus clock frequency is equal to (K*X)/time, wherein K is equal to the number of bus clocks needed to perform the operation, X is equal the number of operations performed, and time is equal to time needed to perform the X number of operations.

4. The system as described in claim 1, wherein the operation is a no operation (NOP).

5. The system as described in claim 1, wherein the processor is a central processing unit (CPU).

6. The system as described in claim 1, wherein the bus includes at least one of Industry Standard Architecture (ISA), Extended Industry Standard Architecture (EISA), Micro Channel Architecture, Peripheral Component Interconnect (PCI), and Peripheral Component Interconnect-X (PCI-X).

7. A method of determining bus frequency, comprising:
starting a timer by a processor;
initiating a bus device communicatively coupled to the processor over a bus, wherein the bus device is initiated to perform a number of operations;
receiving an indication by the processor, the indication suitable for indicating that the number of operations were performed by the bus device;
stopping the timer by the processor in response to the received indication; and
computing a bus clock frequency based upon time taken to complete the number of operations as indicated by the timer and the number of operations performed by the bus device.

8. The method as described in claim 7, wherein the bus clock frequency is computed by the following, the bus clock frequency is equal to X divided by time, wherein X is equal the number of operations performed, and time is equal to time needed to perform the X number of operations.

9. The method as described in claim 7, wherein an operation takes more than one bus clock to perform, the bus clock frequency is equal to (K*X)/time, wherein K is equal to the number of bus clocks needed to perform the operation, X is equal the number of operations performed, and time is equal to time needed to perform the X number of operations.

10. The method as described in claim 7, wherein the operation is a no operation (NOP).

11. The method as described in claim 7, wherein the processor is a central processing unit (CPU).

12. The method as described in claim 7, wherein the bus includes at least one of Industry Standard Architecture (ISA), Extended Industry Standard Architecture (EISA), Micro Channel Architecture, Peripheral Component Interconnect (PCI), and Peripheral Component Interconnect-X (PCI-X).

13. A method of determining bus frequency, comprising:
initiating a bus device communicatively coupled to a processor over a bus, wherein the bus device is initiated to perform a number of operations;
receiving an indication by the processor, the indication suitable for indicating that the number of operations were performed by the bus device; and
computing a bus clock frequency based upon time taken to complete the number of operations performed by the bus device.

14. The method as described in claim 13, wherein the time is measured utilizing a timer accessible by the processor.

15. The method as described in claim 13, wherein the timer is included with the processor.

16. The method as described in claim 13, wherein the bus clock frequency is computed by the following, the bus clock frequency is equal to X divided by time, wherein X is equal the number of operations performed, and time is equal to time needed to perform the X number of operations.

17. The method as described in claim 13, wherein an operation takes more than one bus clock to perform, the bus clock frequency is equal to (K*X)/time, wherein K is equal to the number of bus clocks needed to perform the operation, X is equal the number of operations performed, and time is equal to time needed to perform the X number of operations.

18. The method as described in claim 13, wherein the operation is a no operation (NOP).

19. The method as described in claim 13, wherein the processor is a central processing unit (CPU).

20. The method as described in claim 13, wherein the bus includes at least one of Industry Standard Architecture (ISA), Extended Industry Standard Architecture (EISA), Micro Channel Architecture, Peripheral Component Interconnect (PCI), and Peripheral Component Interconnect-X (PCI-X).

* * * * *